US006993009B2

(12) United States Patent
Kelly et al.

(10) Patent No.: US 6,993,009 B2
(45) Date of Patent: Jan. 31, 2006

(54) METHOD AND APPARATUS FOR DERIVING UPLINK TIMING FROM ASYNCHRONOUS TRAFFIC ACROSS MULTIPLE TRANSPORT STREAMS

(75) Inventors: Frank Kelly, Walkersville, MD (US); David Kloper, Mt. Airy, MD (US); Kasra Akhavan-Toyserkani, Rockville, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 849 days.

(21) Appl. No.: 09/733,156

(22) Filed: Dec. 8, 2000

(65) Prior Publication Data

US 2002/0105976 A1 Aug. 8, 2002

Related U.S. Application Data

(60) Provisional application No. 60/188,368, filed on Mar. 10, 2000, provisional application No. 60/197,246, filed on Apr. 14, 2000.

(51) Int. Cl.
*H04J 3/06* (2006.01)

(52) U.S. Cl. ....................... 370/350; 370/508; 370/519

(58) Field of Classification Search ................ 370/321, 370/324, 350, 503, 508, 509, 510, 514, 517, 370/519, 579; 395/356
See application file for complete search history.

(56) References Cited

U.S. PATENT DOCUMENTS 5,790,939 A * 8/1998 Malcolm et al. ........... 455/13.2
5,809,091 A * 9/1998 Barrow ........................ 375/354
5,898,681 A * 4/1999 Dutta ......................... 370/229
5,912,886 A * 6/1999 Takahashi et al. .......... 370/350
5,982,761 A * 11/1999 Dutta ......................... 370/337
6,366,970 B1 * 4/2002 Wolff et al. .................... 710/52
6,452,541 B1 * 9/2002 Zhao et al. ............ 342/357.06
6,463,040 B1 * 10/2002 Dutta ......................... 370/280
6,799,019 B1 * 9/2004 Eilts ........................... 455/101
6,834,039 B1 * 12/2004 Kelly et al. ................. 370/229

* cited by examiner

*Primary Examiner*—Kwang Bin Yao
*Assistant Examiner*—Blanche Wong
(74) *Attorney, Agent, or Firm*—Craig Plastrik

(57) ABSTRACT

A communication apparatus that shares precise return channel uplink timing information includes a common symbol timing reference and one or more control stations that each transmit independent asynchronous DVB data streams which evenly share the common symbol timing. The control stations each include respective delay trackers to determine broadcast transmission delays associated with the particular control station and transmission path. Each broadcast data stream includes the same non real-time frame marker and a transmission delay message particular to the respective control station. A remote receiver receives one of the broadcast streams and timestamps the non real-time frame marker with a local time of receipt. A timing recovery circuit determines an upcoming return channel frame start time by adjusting the local time of receipt by the particular broadcast transmission delay and a unique receiver offset time. A local transmitter subsequently uplinks a TDMA message in a predetermined time-slot after the return channel frame start time. The method for transmitting a frame synchronized message includes receiving a non real-time frame reference marker in a receiver, timestamping the received frame reference marker with a reception time, and subsequently receiving a control node timing differential at the receiver. The local reception time of the non real-time frame marker is corrected to determine the proper return channel frame transmit start time by applying the control node timing differential and the local offset time. Users then uplink a message during an assigned period after the return channel frame transmit start time.

33 Claims, 6 Drawing Sheets

FIG. 1 - (CONVENTIONAL ART)

IP/DVB PROTOCOL LAYERING

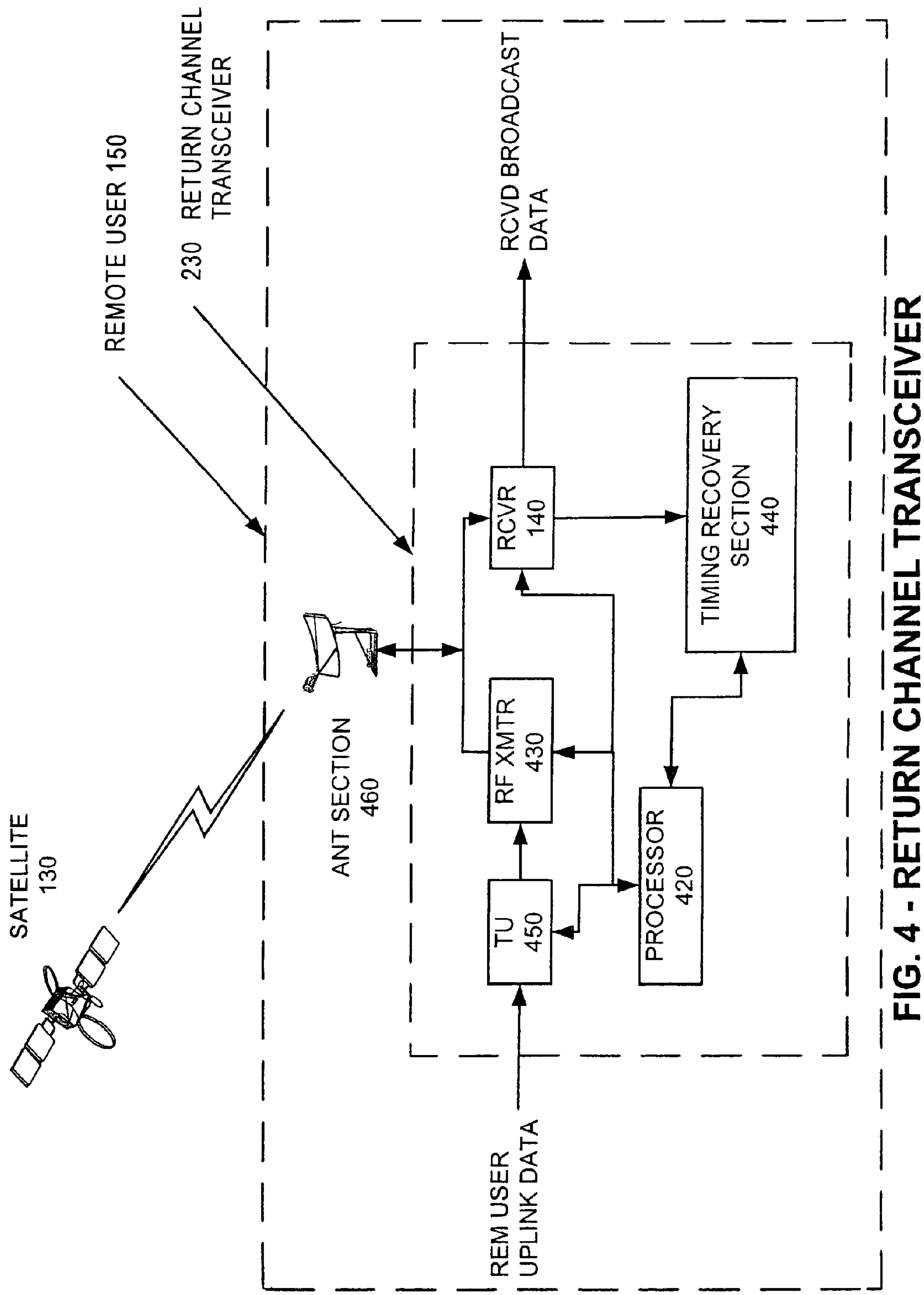
FIG. 4 - RETURN CHANNEL TRANSCEIVER

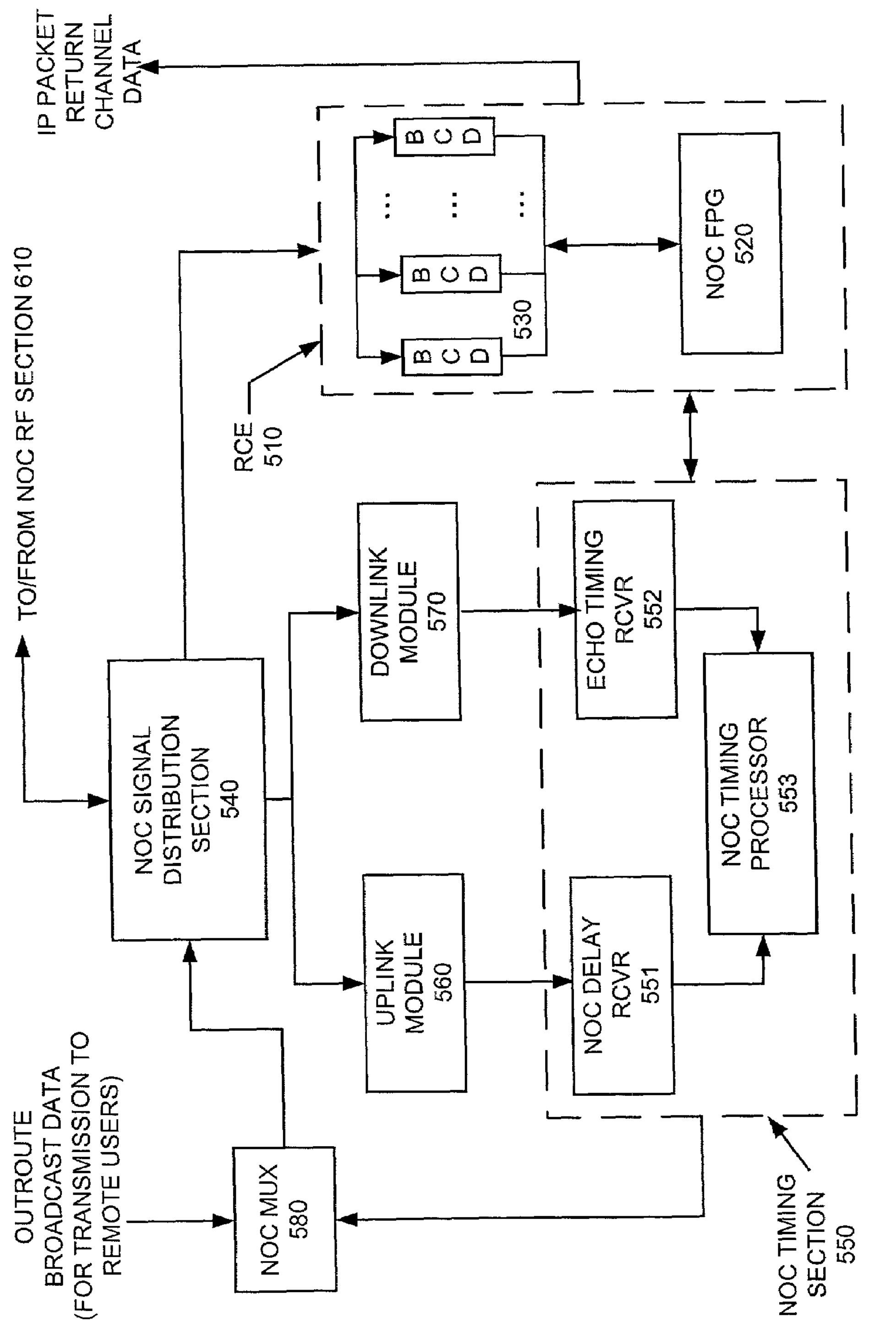
FIG. 5 - NOC RETURN CHANNEL EQUIPMENT INTERFACE

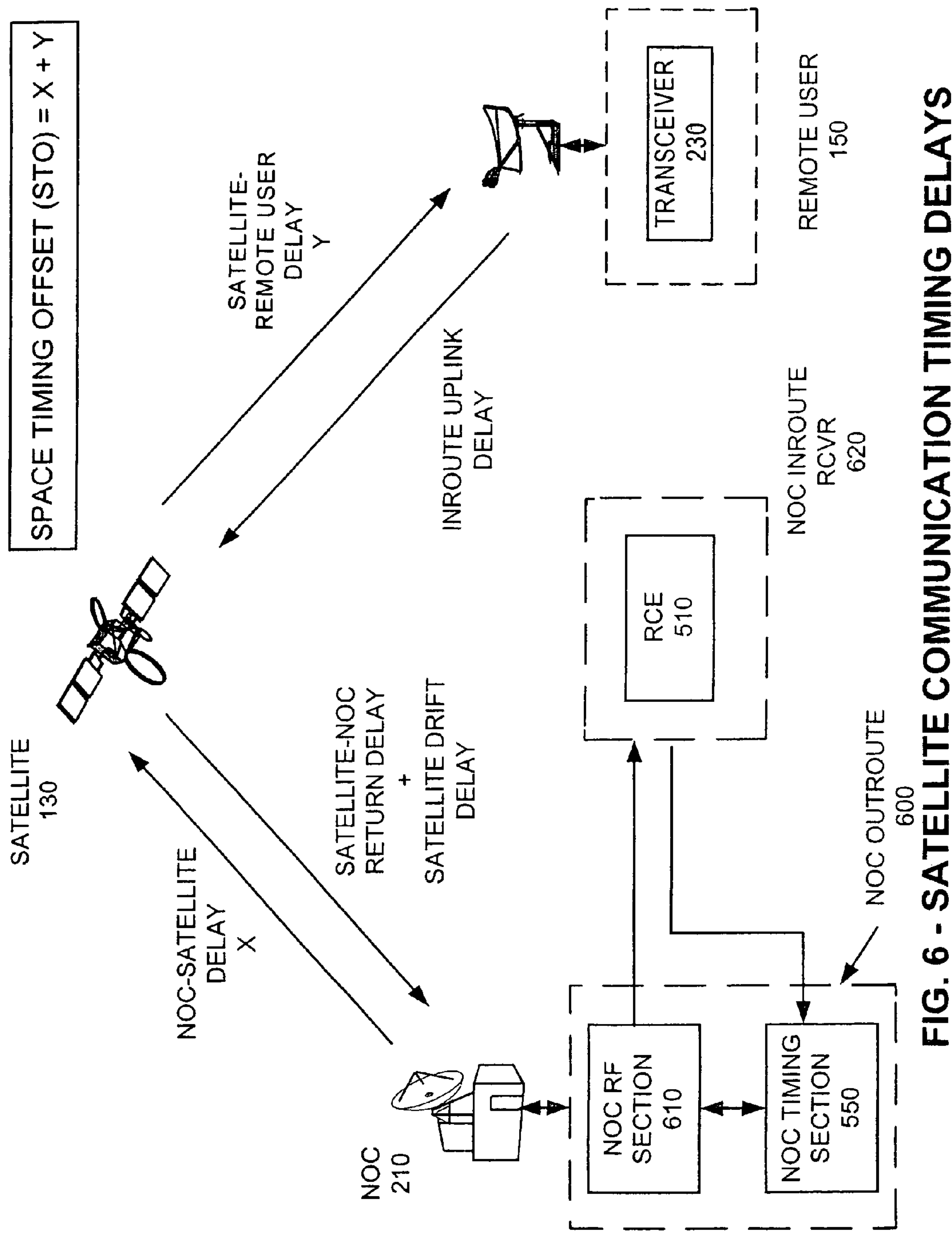
FIG. 6 - SATELLITE COMMUNICATION TIMING DELAYS

METHOD AND APPARATUS FOR DERIVING UPLINK TIMING FROM ASYNCHRONOUS TRAFFIC ACROSS MULTIPLE TRANSPORT STREAMS

CROSS-REFERENCE TO RELATED APPLICATIONS

This application claims the benefit under 35 U.S.C. § 119(e) of U.S. Provisional Application of Kelly et al. entitled "Precise TDMA Timing Based off of DVB Transport Stream Asynchronous Traffic, Possibly Shared Across Multiple Transport Streams", Ser. No. 60/188,368, filed on Mar. 10, 2000, and of U.S. Provisional Application of Kelly et al. entitled "Two-way Communications System and Method", Ser. No. 60/197,246, filed on Apr. 14, 2000, the entire contents of each being incorporated herein by reference.

BACKGROUND OF THE INVENTION

1. Field of the Invention

This invention relates generally to data timing sharing and recovery in a communication system, and even more particularly to derivation of precise TDMA uplink timing across multiple satellite asynchronous Digital Video Broadcast (DVB) transport streams.

2. Description of the Related Art

Using satellites for Internet and Intranet traffic, in particular multicasting of digital video through use of DVB and two-way broadband communication has recently received a great deal of attention. There are a number of applications using satellites in one or two-way data communications, and each presents unique timing and transmission problems which must be considered. Satellites can help relieve Internet congestion and bring the Internet and interactive applications to countries that do not have an existing network structure, as well as provide broadband interactive application support.

In a typical broadcast mode, geosynchronous satellites relay a signal from a single uplink station to a number of receivers within the "footprint" of the satellite. The satellite system covers a footprint, which could, for example, represent all or a portion of the continental U.S. When the signal carries packetized digital data, a geosynchronous satellite is an excellent mechanism for carrying multicast data, as a multicast packet need only be transmitted or "broadcast" once to be received by any number of remote receivers. Such a signal, by carrying both unicast and multicast packets, can support both normal point-to-point and multicast applications.

As one means of using satellite technology in this growing field, very small aperture terminals (VSATs) provide rapid and reliable satellite-based telecommunications between an essentially unlimited number of geographically dispersed sites. VSAT technology has established effective tools for LAN internetworking, multimedia image transfer, batch and interactive data transmission, interactive voice, broadcast data, multicast data, and video communications. The emergence of VSAT technology has provided a practical solution for broadband delivery. Using a system of deployed satellites in conjunction with the necessary ground-based infrastructure and VSAT terminals, users can potentially transmit and receive video, audio, multimedia, and other digital data hundreds of times faster than over conventional phone or terrestrial data lines.

The Internet Protocol (IP) is the most commonly used mechanism for carrying multicast data. Examples of satellite networks capable of carrying IP Multicast data include Hughes Network System's Personal Earth Station (PES) VSAT system and Hughes Network System's DirecPC® system. Combining VSAT delivery with standards-based IP multicast ensures users a less expensive and more flexible approach to achieving high-quality, real-time broadcasting.

As for digital TV transmission, MPEG-2 emerged as the digital entertainment TV compression standard (ISO 13818) for transmission media such as satellite, cassette tape, over-the-air, CATV, and new broadband multimedia data and interactive services wherein MPEG-2 packets are used as "data containers". The MPEG-2 system standard simply defines a packet structure for multiplexing coded audio and video data into one stream and keeping it synchronized. Although the MPEG-2 standard does not prescribe which encoding methods to use, the encoding process, or encoder details, the standard does specify a format for representing data input to the decoder, and a set of rules for interpreting these data. Video can thus be encoded using inexpensive MPEG standards-based encoders that encapsulate the MPEG packets in IP multicast frames.

MPEG-2 defines two types of streams—the Program Stream which includes the packet structure above, and the Transport Stream, which offers robustness necessary for noisy channels, as well as the ability to include multiple, asynchronously multiplexed programs with independent time bases in a single stream. The Transport Stream is well-suited for delivering compressed video and audio over error-prone channels such as a satellite transponder. However, the MPEG-2 specification does not provide all the information necessary to ensure interoperability, data broadcasting, and delivery scheduling in a TV system.

In response to this need, DVB standards have been developed and published by the European Telecommunications Standards (ETSI), and have been globally adopted. DVB is fundamentally an MPEG-2 based system, which provides the basis of DVB video, audio, and transport across a variety of media such as satellite, cable TV, broadcast, etc. For this reason, DVB has defined a set of implementation guidelines for MPEG-2 in DVB which cover the minimum requirements for interoperability for baseline standard definition television (SDTV), high definition television (HDTV), and DVB Integrated Receiver Decoders (IRD). Data broadcasting is a key application of digital TV, and DVB has taken elements of MPEG-2 Digital Storage Media—Command and Control (DSM-CC) and produced specifications and guidelines which now provide the basis for most data broadcast applications around the world.

MPEG-2 was chosen as the basis for DVB source coding of audio and video, and for the creation of Program Elementary Streams and Transport Streams at the systems level. However, MPEG-2 standards are generic and are considered by the industry to be too wide in scope to be directly applied to DVB. Accordingly, industry guidelines have been established to restrict MPEG-2 syntax and parameter values, as well as suggesting preferred values for use in DVB applications to ensure interoperability across different media, a requirement which is frequently needed in the complex signal distribution environment. The core of DVB is its series of transmission specifications, including the DVB-S satellite transmission standard, based on QPSK or Offset QPSK (OQPSK), which is now the defacto world satellite transmission standard for digital TV applications.

Satellite DVB technology and the Internet Protocol (IP) have thus necessarily converged ("IP/DVB") to allow users transparent access to a variety of broadband content, including live video, large software applications, and media-rich web sites. The borders between digital video broadcasting and computers have necessarily blurred —TV broadcasters transmit data, businesses broadcast multimedia applications, and even the most remote user can use interactive communications. From the outset of DVB, interactive applications have been perceived as being the cornerstones of the new generation of digital television. One of the strengths of DVB technology lies in the fact that it enables the point-to-multipoint transmission of very large amounts of data at high data rates while securely protecting against transmission errors. Such data may include audio and video but, in many applications, the data will be large files or other forms of generic information.

In support of these developments, VSAT systems, such as the Personal Earth Station mentioned above, allow commercial users to access one of a generally limited number of satellite return channels to support two-way communication. The choice of return or inbound channel is usually restricted to only a few of the possible channels preconfigured by a combination of hardware and/or software limitations. Other consumer-oriented hybrid systems, such as DirecPC® Turbo Internet, may use a dialup modem or other terrestrial link (as well as other non-satellite media) to send HTTP requests to the Internet, and may receive responses either via the outbound satellite channel, or a dialup modem connection. Some commercial systems may use a VSAT system terminal for Internet access to receive HTTP responses via the outbound satellite broadcast channel, and to send HTTP requests to the Internet through a VSAT inbound channel. Unfortunately, as these systems are mass-marketed to consumers and the number of users increases, the generally limited number of inbound channels can experience congestion and reduced user throughput as a result of an increasing number of users competing for a finite number of inbound satellite channels. The potential benefits that VSAT technology bring to consumers in the area of broadband delivery are necessarily diminished.

FIG. 1 partially depicts one-way satellite broadcast system 100 wherein One-Way NOC 110 transmits DVB transport stream 120 to through satellite 130 to multiple remote users 150 (1 to n). Each remote user 150 has a receiver (RCVR) 140 which receives and demodulates the data contained in DVB transport stream 120. One-Way NOC 110 may also provide and receive information to/from the internet or an intranet through gateway 160. The return link from remote users 150 to One-Way NOC 110, e.g. a terrestrial line, is not shown.

As the use of two-way satellite networks has expanded into the consumer market, industry has further pursued internetworking of multiple satellite-broadcast networks and their associated independent inroute ("inbound") or uplink channels. As the market expands, the number of possible uplink users further increases, and the previous approaches to allocation of return channels to users in fixed, predetermined groups necessarily requires additional hardware and system complexity in order to accommodate the increased uplink demand. Further, this approach becomes increasingly inefficient both in terms of hardware allocation, cost, and uplink channel utilization, since many of the available groups of uplink channels may be either heavily or lightly loaded or subject to load imbalance relative to other inroute groups because of each user being hard-configured for access to a specific inroute channel, or to only a limited number of channels.

Slotted-time uplink channels are commonly used and may be based on a Time-Division Multiple Access (TDMA) approach, wherein precise system timing is necessary to allow multiple users access to the necessary bandwidth and ability to transmit information in a multiplexed fashion on the return channel. TDMA allows a number of users to access a single radio frequency (RF) channel without interference by allocating unique time slots to each user within each channel. In TDMA, access is controlled using a frame-based approach. Transmissions are grouped into frames, with a frame synchronization ("sync") signal usually being provided at the beginning of each frame. Following the frame sync, there are a number of time "slices" within the frame used for a burst transmission. In the simplest case, one time slice is allocated to each of the users having the need to transmit information. In more complicated systems, multiple time slices are made available to users based on transmission need or a prioritization scheme. After all time slices have elapsed, another frame synchronization signal is transmitted to restart the cycle. Thus, the frame sync serves as a system time reference that provides a common transmit timing source to each uplink user who transmits in a burst during a pre-assigned time slot.

TDMA requires a method for precise timing of the epochs of burst transmission to reduce burst overlap and consequent "collisions" of different users' transmissions. Providing a common time reference for a limited number of remote network receivers receiving a single downlink or broadcast beam and sharing a limited number of uplink channels is relatively easy to accomplish, particularly when transmission and reception delays between the network control and the various users are well-characterized. For example, if synchronous operation is used, i.e., where the symbol rate of the digital transmission signal is precisely a multiple of the TDMA frame frequency, the TDMA frame rate can be locked to the system symbol clock at the network hub or earth station, and remote users can derive the frame rate from the recovered symbol timing.

However, frame timing sharing is more difficult with the evolution of multiple-beam satellites, and when sharing a larger number of different inroute or uplink channels among a large number of users. These users may be receiving different asynchronous broadcasts transmitted either through the same or different transponders on the same satellite or even on different satellites. Asynchronous digital transmissions have a symbol rate which is not a multiple of the TDMA frame rate. Establishing a common uplink transmission time reference for each of the users is more difficult due to the variety of delays and transmission paths in use, as well as the asynchronous nature of the broadcasts.

Several potential solutions for symbol timing recovery are available when asynchronous broadcast transmissions are used. For example, Global Positioning System (GPS) based timing, packetized elementary stream timing for Program Streams, or MPEG-2 Program Clock Reference (PCR) timing for Transport Streams may be used to synchronize a system. However, each of these solutions has relatively high-cost because of the additional processing and hardware requirements, including additional equipment at each of what could be a large number of remote user sites.

Currently, single, low-cost timing sources for sharing both frame and symbol timing throughout a communication system, particularly across multiple asynchronous transport streams is not available.

What is needed, therefore, is a relatively low-cost, accurate, and reliable system and method for sharing synchronized uplink data frame and symbol timing across a large network of geographically dispersed users receiving information across multiple transport streams, carriers, or satellites, without the necessity of involving multiplexing and modulation equipment. What is further needed is a system and method which solves the timing and uplink access problems associated with an increase in the number of users in the system, and which eliminates the need for major modifications or additions to network components required to transmit and receive the data.

SUMMARY OF THE INVENTION

The present invention solves the aforementioned problems of providing a low-cost and accurate system symbol and frame timing reference to dispersed uplink transmissions to reduce collisions of user transmissions, and to ensure all transmissions are synchronized in accordance with time slot allocations.

In one aspect of the invention, a communication system for sharing uplink timing information includes a common symbol timing reference and one or more control stations which each transmit different broadcast data streams in accordance with the common symbol timing reference. The first control station includes a delay tracker to determine the transmission delay associated with the first control station, and the second control station includes a delay tracker to determine the transmission delay associated with the second control station. Within each of the broadcast data streams, a common non real-time reference frame marker and a different delay message corresponding to the associated transmission delay are included. A remote ("local") receiver receives one of the broadcast data streams. Each of the local receivers at their respective remote locations recovers their appropriate delay message, depending on the broadcast being received, and timestamps the non real-time reference frame marker with the associated local time of receipt. Timing recovery or correction circuits at each of the sites determine the system return channel uplink frame start time by correcting the associated local time of receipt with a local timing offset. The local timing offset is determined by the respective transmission delays, so that remote users can uplink messages in the proper time-slot(s) after the system uplink frame start time. This approach works even if different remote users receive the non real-time reference frame marker from different asynchronous broadcasts.

In a second aspect of the invention, a method for transmitting a frame synchronized message in a slotted-time communication system having a plurality of distributed user nodes and one or more control nodes includes receiving a reference marker in a local receiver of one of the plurality of distributed user nodes; timestamping the received reference marker with a local reception time; subsequently receiving a control node timing differential in the local receiver; correcting the local reception time by applying the control node timing differential and a local offset time; determining a start time for a system-wide return channel transmit frame using the corrected local reception time; and transmitting a remote user message during a preassigned period within the system-wide return channel transmit frame.

The present invention has a number of features that distinguish it over conventional digital timing recovery and sharing schemes. For example, the timing recovery method of the present invention uses an independent non real-time message structure to provide realtime TDMA timing to receivers for use in deriving uplink frame and symbol timing. The accuracy of this novel approach is determined at least in part by the jitter, or pulse-to-pulse variation, in each of the local receiver clocks, and the resulting system accuracy is comparable to more costly GPS-based solutions.

This timing sharing approach also allows several DVB transport streams to easily share timing among a common set of TDMA uplink channels, and further allows a DVB transport stream to be used to derive the precise TDMA timing, even when the data must traverse across multiple LANs and DVB multiplexers before being transmitted as part of the transport stream.

Further, an asynchronous data source may be used to provide the system frame timing to many remote network sites, even across multiple transport streams, carriers, or satellites without the necessity of multiplexing and modulation equipment. In this approach, the modulated broadcast streams use a central clock timing to ensure symbol timing is shared evenly throughout the system, and the ability to share both symbol and frame timing is substantially independent of the asynchronous broadcast signal being received.

In addition, the method and system of the present invention simplifies adding a large number of new uplink users who can share a set of TDMA channels by allowing some receivers on each of several transport streams to synchronize to the same uplink timing, because each of the transport streams has specific system symbol and frame timing information associated therewith which is sourced from a centralized clock and non real-time reference timing pulse.

Finally, the method and system of the present invention allow expansion to an (essentially) unlimited number of users on the same return channels, and allows these users to all use the same symbol and frame timing derived from different transport streams.

These and other features and advantages of the present application will become more readily apparent from the detailed description given hereinafter. However, it should be understood that the detailed description and specific examples, while indicating a preferred embodiment of the invention, are given by way of illustration only, since various changes and modifications within the spirit and scope of the invention provided by this detailed description will become apparent to those skilled in the art.

BRIEF DESCRIPTION OF THE DRAWINGS

The features and advantages of the invention will be more readily understood upon consideration of the following detailed description of the invention, taken in conjunction with the accompanying drawings in which:

FIG. 4 provides a block diagram of the Return Channel Transceiver of the present invention;

FIG. 5 depicts the NOC Return Channel Equipment Interface; and

FIG. 6 shows the communication timing delays associated with the NOC broadcast to the remote users.

DETAILED DESCRIPTION OF THE INVENTION

A preferred embodiment of the method and system of providing TDMA system timing of the present invention is described below. Although described generally in terms of Hughes Network Systems' Two-Way DirecPC® for ease of discussion, the thrust of the communication timing sharing system and method of the present invention could be embodied in other forms with only slight variations as to the detailed implementation. It also will be obvious to skilled artisans in the relevant art that all features of the invention will not be described or shown in detail for the sake of brevity and clarity.

Figure 1:
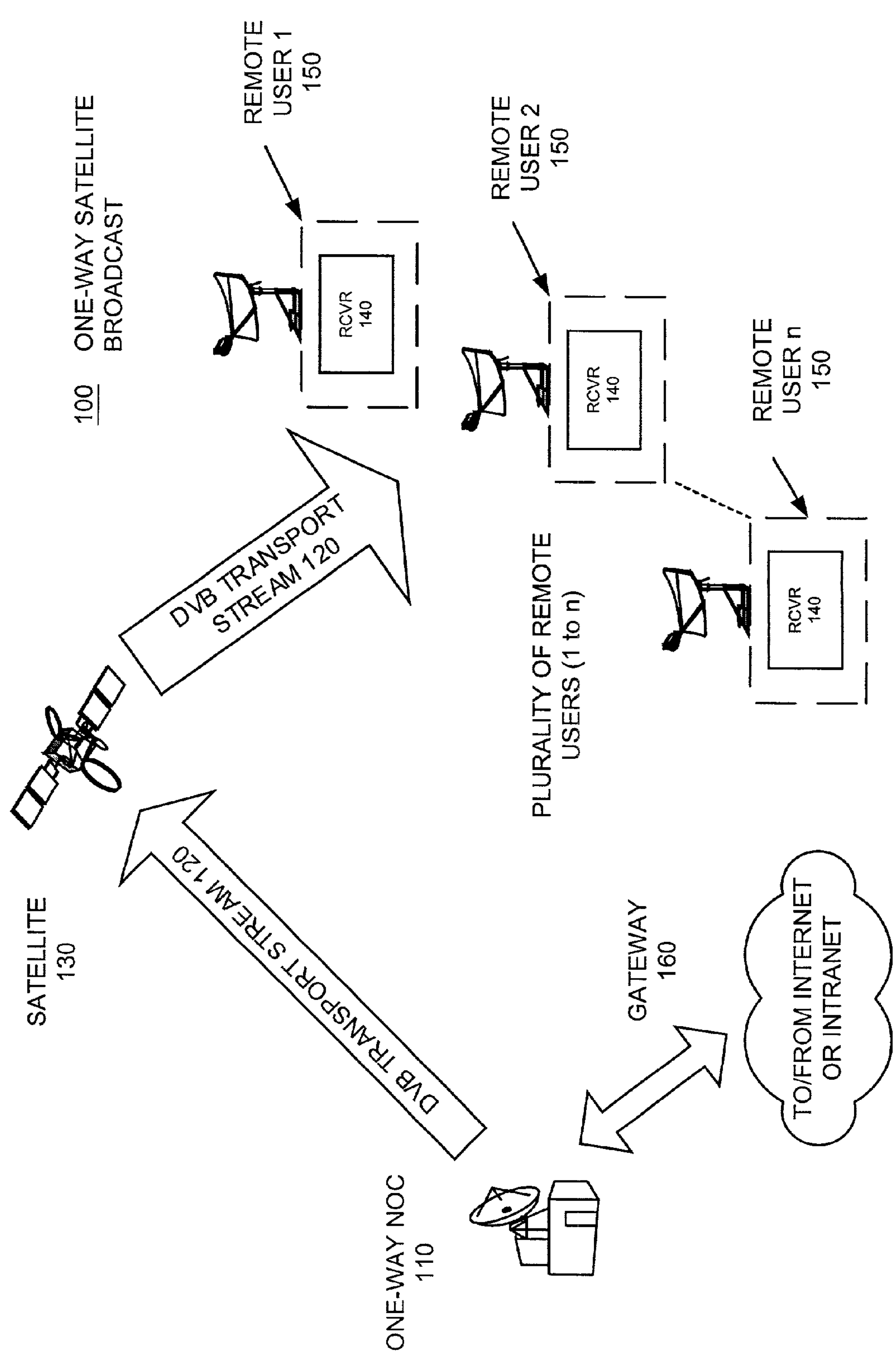
FIG. 1 depicts a conventional one-way satellite broadcast system.

An exemplary one-way conventional satellite broadcast system 100 is depicted in FIG. 1. The present invention is designed to control the burst timing of a group of return channels that share the same frame timing, as previously mentioned. For simplicity, this system is characterized in FIG. 2 as including one or more Network Operations Center (NOC) 210 (also commonly known as a "hub", "outroute", "control node", "control station", or "earth station", etc.), at least one satellite 130 having uplink and downlink transponders, system time reference 240 which provides common symbol timing to each NOC 210 in the system, one or more (i.e., 1 to n) remote users 150 at a user node, each having a satellite receive and transmit capability provided by an associated transceiver 230. NOC 210 preferably provides access to the internet or an intranet through gateway 160. NOC inroute receiver 620 (shown on FIG. 6) may be collocated with NOC 210, or may be separate from NOC 210.

Figure 2:
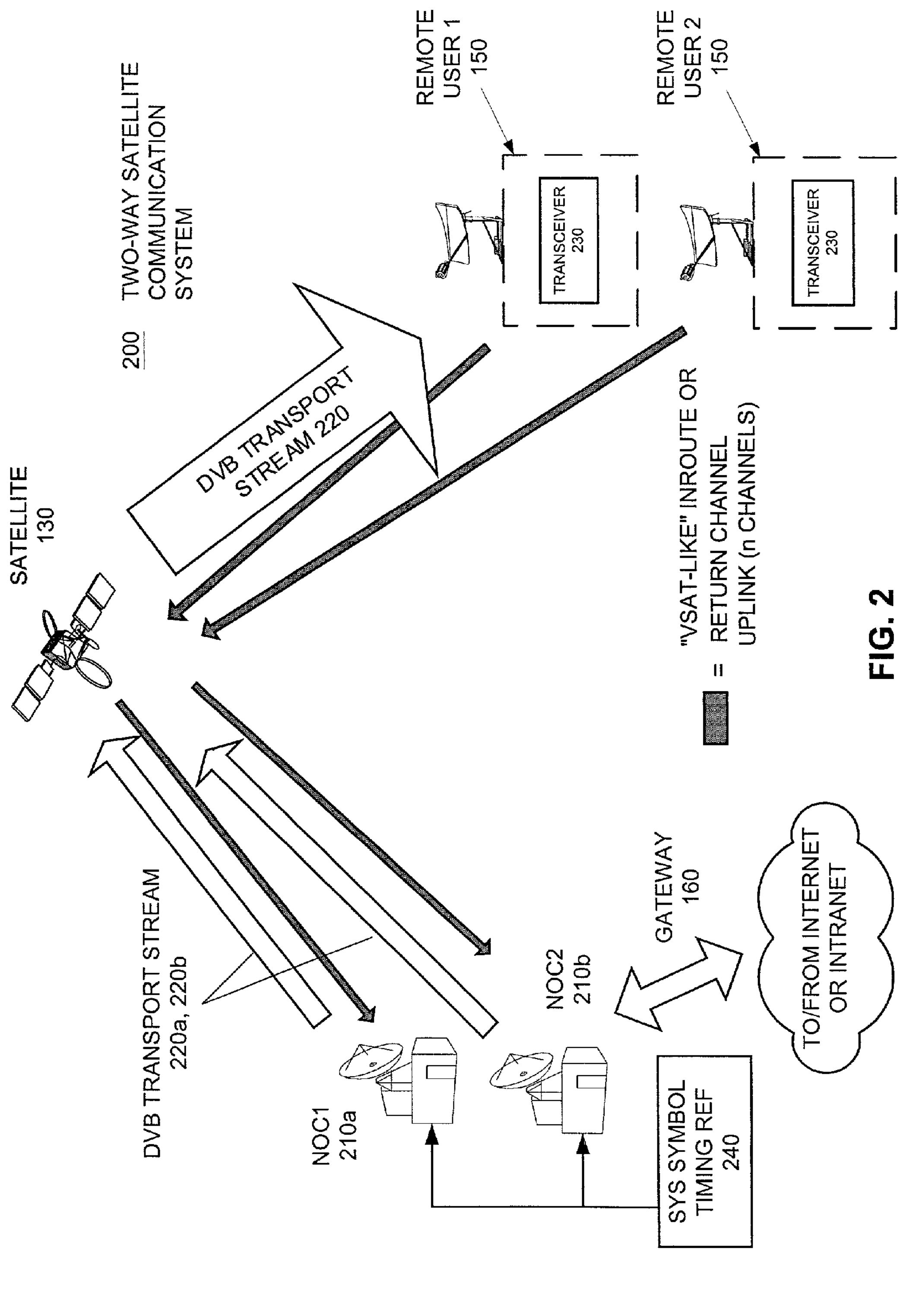
FIG. 2 provides a representation of the two-way satellite communication system of the present invention.

FIG. 2 also illustrates two NOCs 210, i.e. NOC1 210*a* and NOC2 210*b*, which each provide at least one DVB Transport Stream 220 (e.g. 220*a* and 220*b*) to satellite 130 for further retransmission. The DVB transport stream retransmitted from satellite 130 is shown merely as DVB transport stream 220 for clarity, which may differ from DVB transport stream 120 (FIG. 1) only in the uplink frame timing information contained therein, as discussed below. Each NOC 210 in the system of the present invention may provide support for several receive or outroute channels. However, application of the method and system of the present invention is not intended to be limited to a system having a specific number of NOCs 210 or remote users 150. Further, NOC 210 in FIG. 2 is distinguished from NOC 110 in FIG. 1 by NOC 210 having the ability to support receiving and processing return channel traffic from remote users 150.

FIG. 2 illustrates a return channel transceiver ("transceiver") 230 which provides an integrated uplink (or "return channel") capability. The capability added by transceiver 230 provides two-way broadband communications via satellite 130. The receive channel in transceiver 230 could, for example, operate at a rate of 48 Mbps, and the transmit channel in transceiver 230 is preferably a VSAT-like TDMA channel. Depending on consumer requirements, the channel rates for the transmit, "return", or "inroute" channel could be, for example, 64 kbps, 128 kbps, 256 kbps, or possibly even higher, as consumer needs arise. A group of multiple transmit channels may also be shared among several independent DVB transport streams 220, whether transmitted from the same or different NOC 210. The return channel preferably contains a link-layer protocol, at the burst level, to provide for a substantially lossless channel.

Figure 3:
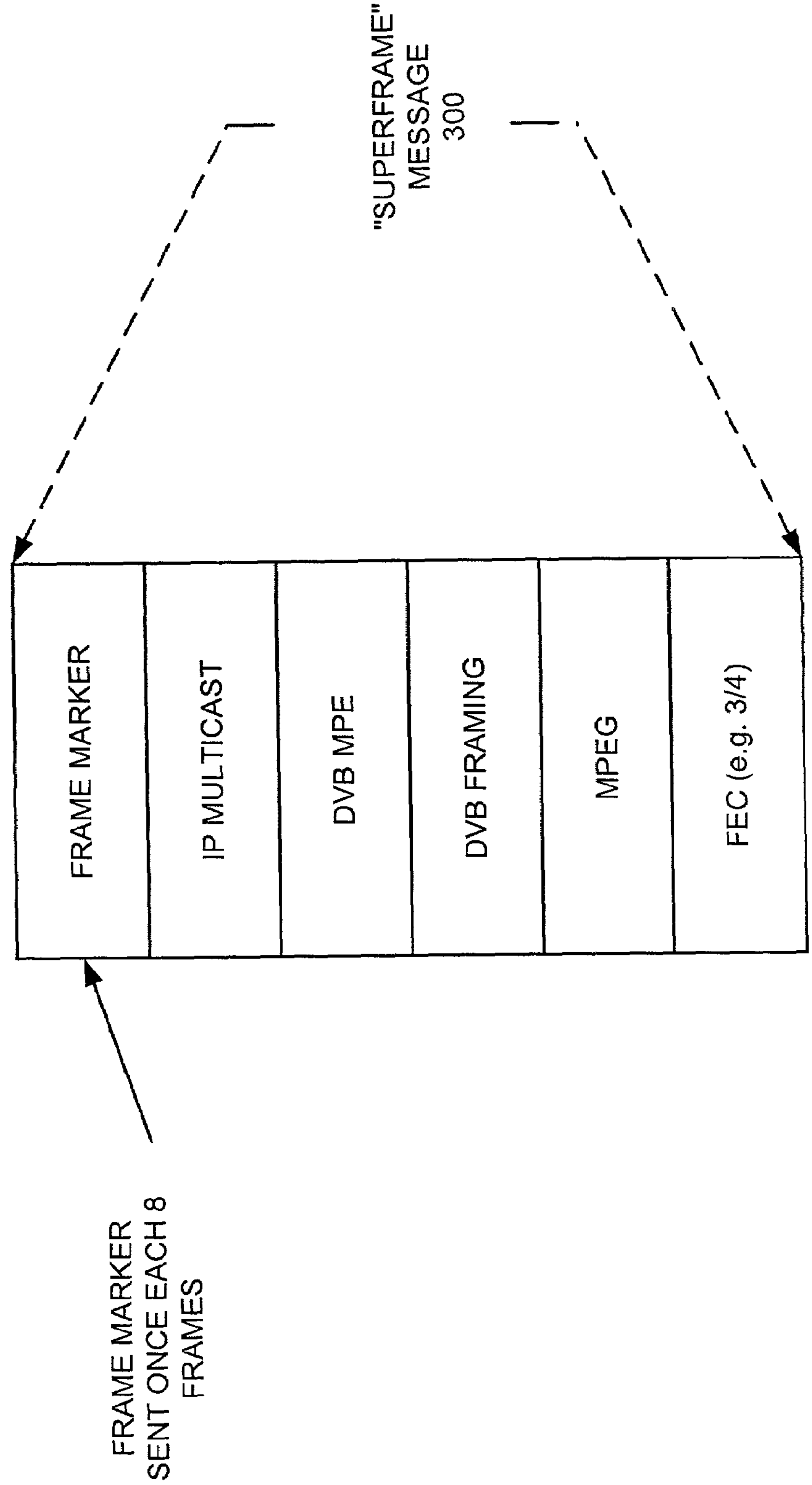
FIG. 3 portrays the preferred protocol IP/DVB layering of the broadcast signal associated with a superframe message used in the present invention.

The receive channel in transceiver 230 receives a DVB transport stream 220 which preferably uses an IP packet format which may include packets arranged in accordance with the Multiprotocol Encapsulation (MPE) standard. A preferred superframe message 300 is depicted in FIG. 3, wherein the frame marker is not necessarily transmitted in every frame. The stream preferably has DVB compliant MPEG-2 formatting supporting multiple MPE messages in a single MPEG frame. The transport stream may include fixed-size 204 byte MPEG packets, which could contain 188 bytes of user traffic and 16 bytes of forward error correction (FEC) data, for example. An MPE header may also preferably include specific media access control (MAC) data fields to indicate the type of media or traffic contained in the data stream, e.g., unicast, multicast, conditional access, or return channel broadcast messages, and other data fields to indicate whether the packet is encrypted. FEC at various rates is also preferably supported, e.g. FEC rates of 1/2, 2/3, 3/4, 5/6, or 7/8. Further, the header of each frame may also contain a Packet Identifier (PID) to distinguish between elementary streams so that remote user 150 may filter the message by PID. For ease of discussion, DVB transport stream 220 will be referred to hereinafter as a "broadcast".

Turning to FIG. 4, transceiver 230 preferably supports TCP/IP applications, e.g. web browsing, electronic mail and FTP, and also multimedia broadcast and multicast applications using IP Multicast, e.g. MPEG-1 and MPEG-2 digital video, digital audio and file broadcast. Transceiver 230 provides a high-speed, over-the-air return channel as an alternative to a low-speed terrestrial link. Transceiver 230 contains receiver (RCVR 140), processor 420, RF transmitter (RF XMTR) 430, timing recovery section 440, and Transmit Unit (TU) 450. RF XMTR 430 modulates and transmits, in burst mode, the in-bound carrier to satellite 130 and NOC 210 (shown on FIG. 2). RF XMTR 430 may operate with, and be controlled by RCVR 140 via processor 420, which also could master RCVR 140 by use, for example, of a Universal Serial Bus (USB) adapter (not shown). Configuration parameters and inbound data from processor 420 may be input to RF XMTR 430 through a serial port (not shown), and transmitter status information from RF XMTR 430 may also be provided through the serial port to processor 420. TU 450 conditions the outgoing data signal by incorporating the appropriate signal protocols and modulation scheme, e.g. a IP/DVB protocol and TDMA using QPSK techrnques.

RCVR 140 receives the appropriate broadcast from satellite 130 through antenna section 460, and provides appropriate timing-related signals to timing recovery section 440. Timing recovery section 440 corrects or compensates the time of receipt of the received frame marker in accordance with timing information contained in the received broadcast signal. Timing recovery section 440 further enables RF XMTR 430 through processor 420 and TU 450 to transmit at the appropriate time in accordance with a TDMA time-slot allocation scheme. Significant cost savings can potentially be realized by having RF XMTR 430 mainly comprise firmware-controlled hardware without the necessity of having its own dedicated CPU and embedded software. Finally, antenna (ANT) 460 propagates and receives signals to/from satellite 130.

A discussion of the nature and approach of the synchronized timing system and method of the present invention follows. FIG. 5 shows return channel equipment (RCE) 510 at NOC 210 (shown on FIG. 2) and its interface with NOC timing section 550. RCE 510 reassembles packets received from remote users 150 (shown on FIGS. 2 and 4) over the return channels into IP packets for further processing. Frame timing transmitted in the broadcast stream to remote users 150 (shown on FIGS. 2 and 4) and ultimately used for uplink timing in the return channels is derived from a pulse from NOC frame pulse generator (NOC FPG) 520 in RCE 510. NOC FPG 520 allocates bandwidth, coordinates the aperture configuration, and sends framing pulses to burst channel demodulator (BCD) 530. The number of BCDs 530 supported by RCE 510 is preferably at least 32, to allow redundant equipment support for at least 28 return channels.

Multiple sets of return channel equipment 510 may be provided in a networked cluster arrangement (not shown) within each NOC 210 to allow for processing of a large number of return channels, preferably up to 100,000 or more, for example. Return channel traffic from the remote users provided from the NOC RF section 610 (see FIG. 6) and routed through system signal distribution section 540 is applied to BCD 530 to demodulate return channel data received from the remote users.

In addition, NOC FPG 520 provides framing pulses to NOC timing section 550. NOC timing section 550 includes NOC delay receiver 551 and echo timing receiver 552 which measure packet delays associated with internal NOC delays and NOC-satellite delays, respectively. These receivers can considered to function as "delay trackers" which help in ascertaining the aforementioned delays. These delays are determined from signals provided from system signal distribution section 540 through uplink module 560 and downlink module 570 to NOC delay receiver 551 and echo timing receiver 552, respectively. Uplink module 560 translates the signal from NOC signal distribution section 540 into a form suitable for NOC delay RCVR 551. For example, the signal from NOC signal distribution section 540 may be provided as an intermediate frequency (IF) from the outroute broadcast before transmission, and which may be converted by uplink module 560 to an L-band signal, for example. Similarly, downlink module 570 could, for instance, translate an IF signal from NOC signal distribution section 540 which represents the broadcast signal as "echoed" or received from satellite 130 into another L-band signal provided to echo timing receiver 552. By using this arrangement, NOC delay RCVR 551 and echo timing RCVR 552 could replicate portions of RCVR 140 in order to achieve greater equipment commonality within the system.

NOC timing processor 553 processes the delay information from NOC delay receiver 551 and echo timing receiver 552. NOC timing section 550 provides the appropriate frame timing information to NOC multiplexer section (NOC MUX) 580. NOC MUX 580 combines broadcast data intended for the remote users 150 with the frame timing information from NOC timing section 550, and provides a packetized data signal to system signal distribution section 540 for transmission to satellite 130 through the NOC RF section 610, and ultimately to remote users 150.

NOC FPG 520 periodically causes RCE 510 to send a superframe marker pulse to NOC delay receiver 551 and echo timing receiver 552 through NOC timing section 550 once every integral number of TDMA frames, e.g. 8 frames or 360 milliseconds (ins). At the same time, it sends a superframe header which is included in the broadcast stream transmitted from NOC 210 (shown on FIG. 2) for reception by a RCVR 140 (shown on FIG. 4) located at one or more remote users 150 (shown on FIGS. 2 and 4), and which is also received in the broadcast by NOC echo timing receiver 552 from satellite 130 (shown on FIGS. 2 and 4).

The equipment, signals, and subsystems of each of NOC 210 (shown on FIG. 2) and transceiver 230 (shown on FIG. 2) are preferably interconnected via one or more local area networks (LAN) (not shown) and, even more preferably, are interconnected in accordance with a so-called open system architecture which allows modifications and upgrades to be more easily accomplished as improvements in software and hardware become available.

The concept in the timing approach of the present invention is to provide information to RCVR 140 (shown on FIG. 4) so that transceiver 230 (shown on FIG. 2) may precisely time its burst transmission time as an offset of the received superframe header. The superframe header received in a superframe numbering packet (SFNP) transmitted in the broadcast is used by every remote user 150 (shown on FIGS. 2 and 4) to synchronize their transmit start of frame marker to the superframe marker pulse generated by NOC FPG 520. This packet is used to lock network timing for the return channels, and as a beacon to identify which satellite network is being connected to. Remote user 150 (shown on FIGS. 2 and 4) may also be configured to receive several PID addresses, including the one to be used with its associated NOC FPG 520. Further, each NOC FPG 520 may be allocated its own private PID to ensure that remote users 150 (shown on FIGS. 2 and 4) receive traffic only from their assigned NOC FPG 520.

However, receipt of the SFNP by itself is not sufficient because there are delays from the time that NOC FPG 520 generates the superframe header until the time the receiver actually receives the SFNP.

As shown in FIG. 6, the delay in receipt of the superframe header is equal to three separate delays—an internal NOC outroute delay, a NOC-satellite transmission time delay, and a transmission delay from the satellite to each of the specific remote users 150. The latter two items, NOC-satellite delay and satellite-remote user delay, are known parameters determined during a standard satellite-user "ranging" process during system initialization. However, these values can change slightly due to satellite drift along a vertical axis with respect to the surface of the earth.

To be able to adjust for satellite drift, a known process called "echo timing" is implemented at NOC 210 to measure changes in position of satellite 130. This measures the transmission time from NOC 210 to satellite 130 and, from this measurement, determines the satellite drift relative to NOC 210 which is used to approximate the drift of satellite 130 from the position of remote user 150. These values are used to correct the ranging values determined during initialization. The NOC-to-satellite portion of the satellite delay is sent in the SFNP message and is determined as the difference between timing signals from NOC delay receiver 551 (shown on FIG. 5) and echo timing receiver 552 (shown on FIG. 5). Each remote user 150 preferably has a preconfigured value for the satellite-to-remote user delay that is determined during system installation. The NOC delay at ranging is stored, and the change in NOC delay is applied to the receiver-satellite delay to approximate the time delay associated with satellite drift. The NOC-satellite drift timing is preferably provided in a subsequent SFNP message to remote users 150 so that current drift timing, relative to the initial ranging NOC-satellite echo delay, can be determined for an upcoming transmit frame.

In addition to not knowing the satellite drift, remote user 150 does not know the delay within NOC 210, i.e. NOC outroute delay, which can vary in real-time. The internal NOC delay measures the delay from the time the superframe marker pulse is provided by NOC FPG 520 (shown on FIG. 5), until the time the frame pulse is actually transmitted in a message on the broadcast from NOC 210.

Thus, once every superframe, the internal NOC delay between the time the previous superframe header was supposed to have been sent, and the time that it actually was sent is broadcast in a SFNP message to all remote users 150. This value, along with the "space timing offset" (STO), discussed below, is used by each remote user 150 to calculate the actual start time of the superframe. Remote user 150 uses the calculated superframe start time as the TDMA uplink frame time reference point for determining an upcoming transmit frame start time. Preferably, the internal NOC delay is routinely updated by NOC Timing section 550, and is thereafter broadcast in a subsequent SFNP message to remote users 150.

NOC FPG 520 (shown on FIG. 5) pulses NOC delay receiver 551 (shown on FIG. 5) and echo timing receiver 552 (shown on FIG. 5). After a time interval approximately equal to the STO elapses, NOC FPG 520 (shown on FIG. 5) provides a frame pulse to BCD 530 (shown on FIG. 5). This frame pulse could be provided, for example, once every 45 ms, the preferred frame duration. The STO represents a calculation of the maximum round-trip time from the farthest remote user 150, plus two frame times. A two frame delay is provided as a buffer to ensure that transceiver 230 at remote user 150 has sufficient time to process return channel frame format data, and to provide return channel data for transmission at least one-half frame time ahead of the actual frame transmit time.

The operation of the communication timing system of the present invention will now be described. NOC outroute 600 takes formatted data packets and transmits them on the DVB transport stream 220 (shown on FIG. 2) to satellite 130 for further retransmission to remote users 150. The data stream or "payload" information is transmitted following an appropriately formatted MPE header and initialization vector, if the packets are encrypted.

Included in the DVB transport stream 220 (shown on FIG. 2) is a SFNP which provides a superframe marker, as well as the internal NOC delay and satellite drift correction for a previous superframe marker transmitted in a prior SFNP.

When remote user 150 receives a SFNP at their respective RCVR 140 (shown on FIG. 4), the received superframe packet is tagged with a local time-stamp. This local time-stamp may be created using an internal counter (not shown), which preferably is a 32-bit counter free-running at 32 MHz, for example. Each of the remote sites must determine when the most recently received superframe marker actually occurred at the NOC outroute 600. To do so, each remote user 150 subtracts its known satellite delay, corrected for drift, and the internal NOC delay provided in a subsequently received SFNP Message from the local time of receipt of the previously received superframe packet.

Once the superframe timing has been determined, each remote user 150 determines its upcoming transmission time relative to the local time of receipt of the superframe marker which is adjusted by a local offset time to determine the transmit frame start time such that the transmitted or uplink frame is received at the proper time at NOC 210. The time at which the site must transmit is a satellite hop before the time that NOC 210 expects the data to be received. The transmission time is measured by starting at a time later than the regenerated superframe time by the fixed STO. The NOC delay and the receiver-satellite delay must be subtracted from this timebase. As discussed above, the final adjustment to account for satellite drift is made by determining and applying the difference between the current NOC delay and the ranging delay. Then, knowing the fixed frame length, e.g. 45 ms, the frame start time of a subsequent user transmit frame can be determined.

Knowing when the superframe marker should occur allows the remote user 150 to align the start of a transmit (Tx) frame marker in TU 450 (shown on FIG. 4) with the NOC superframe marker pulse. TU 450 (shown on FIG. 4) preferably has a free-running counter (not shown) that runs synchronously with an internal counter (also not shown) in its associated RCVR 140 (shown on FIG. 4). After a period of time equal to the duration of a return channel frame, e.g. 45 ms, this TU counter value is latched, and an interrupt to its RCVR 140 (shown on FIG. 4) is generated to read the value of the counter in RCVR 140 (shown on FIG. 4). The local time at which this interrupt occurs is compared to when the interrupt should have occurred. This time difference is stored in TU 450 (shown on FIG. 4) to correct for the proper transmit time start. RCVR 140 (shown on FIG. 4) also provides a nominal frame length counter to TU 450 (shown on FIG. 4) to adjust its frame timing. Once the frame timing is adjusted, a nominal value, e.g. close to 45 ms, will preferably be used on a continuing basis with minor adjustments to account for drifts between the counter and the timing pulse. Once TU 450 (shown on FIG. 4) is aligned, there are only small corrections necessary to keep TU 450 (shown on FIG. 4) synchronized to NOC 210. Transceiver 230 (shown on FIGS. 2 and 4) then uplinks a message at the appropriate time which is received by NOC RF section 610 and processed in NOC inroute receiver 620.

The following describes some of the calculations that are performed in both NOC 210 and RCVR 140 (shown on FIG. 4) to regenerate the proper frame timing. The timing variable "OFFSET" represents the aforementioned local offset time. For these calculations, Table 1 provides a listing and description of timing equation variables.

TABLE 1

| | Timing Equation Variables |
|---|---|
| NOC Echo at Ranging "HEr" | Difference in time between a frame exiting a modulator at the NOC and the time when the same frame is received from the RF XMTR after being echoed to the satellite. This is stored by a receiver when it successfully ranges. This value can be provided in terms of timing unit counter units. |
| NOC Echo current "HEc" | Current difference between the frame exiting a NOC modulator and when it was received at the NOC RF SECN after being echoed to the satellite. The NOC timing section may periodically provide this to all receivers in terms of timing unit counter units. |
| NOC Delay "HD" | Amount of time that elapses between a superframe pulse and the superframe message transmission by the NOC RF SECN. This may be provided in each superframe (for the prior superframe) in terms of the timing unit counter units. |
| Superframe Length "SFLen" | Amount of time from one superframe pulse to the next provided in terms of timing unit counter units. This pulse can occur periodically, e.g. once every 360 milliseconds, so this value provides a timebase for a receiver to convert between timing unit counters and either milliseconds or frames. |
| Space Timing Offset "STO" | The number of milliseconds between the superframe pulse and the frame pulse to the BCD for the first frame of the superframe. To convert this to counter units, the equation is STO*SFLen/360. |
| Local Echo "LE" | A value which may be used to determine transmit timing specific to the remote user location. |

The equation for the frame timing at RCVR 140 provides a frame pulse counter offset ("OFFSET") from the superframe being received at the remote user 150, and is calculated as follows. All units used in the equation are referred to a NOC reference counter (not shown). The conversion to a remote counter is based on determining a ratio of the increase of the counter in a superframe in SFNP, and the increase of the counter at RCVR 140 during a superframe.

$$\mathrm{OFFSET} \approx \mathrm{STO} - \mathrm{HEc} - (\mathrm{HEc} - \mathrm{HEr}) - \mathrm{LE}$$

The ranging process, as previously discussed, is used to derive LE. When the ranging process begins, NOC 210 provides an estimated LE based on the location of satellite 130 and location of remote user 150. Remote user 150 will fine-tune and correct LE, storing the correct value when the ranging process successfully completes.

In the system and method of the present invention, and with a preferred remote unit and return channel addressing scheme, there is essentially no limitation on the number ("n") of remote users 150 which may uplink data on a return channel. A minimum of $2^{24}$ (~16 million) transceivers are preferably supported by the addressing scheme embodied within the DVB stream and, even more preferably, up to $2^{28}$ (~256 million) transceivers are supported.

Further, because the return channel is preferably a substantially lossless channel, compression techniques may effectively be employed to reduce bandwidth requirements. IP header compression has the potential to give a tremendous improvement in bandwidth, since such compression eliminates 10–15 bytes for every IP packet.

While a preferred embodiment has been described above in terms of a TDMA timing approach, this preferred embodiment is in no way to be considered limiting, and is provided only by way of example. As a further example, the method and system of deriving precise timing can be accomplished across any type of communication system having multiple users sharing the same media, and may find particular application in any slotted-time system that requires bit timing, e.g. a frequency-time system using a phase-locked loop (PLL) or frequency-locked loop (FLL) based upon the same timing standard.

It will be obvious that the present invention may be varied in many ways. Such variations are not to be regarded as a departure from the spirit and scope of the invention, and all such modifications as would be obvious to one skilled in the art are intended to be included within the scope of the following claims. The breadth and scope of the present invention is therefore limited only by the scope of the appended claims and their equivalents.

What is claimed is:

1. A control station for two-way satellite communication, comprising:

an RF section for transmitting a broadcast signal and receiving a return channel uplink;

a plurality of burst channel demodulators for demodulating the return channel uplink;

a timing section including a delay receiver, an echo timing receiver, and a timing processor receiving outputs from the delay receiver and the echo timing receiver;

a frame pulse generator coupled to the plurality of burst channel demodulators and the timing section, wherein the frame pulse generator provides a superframe marker pulse to the timing section at a first fixed time interval and concurrently provides a superframe header which is included in the broadcast signal, wherein the frame pulse generator pulses the plurality of burst channel demodulators at a second fixed time interval different from the first fixed time interval and at a time later than a time of the superframe marker pulse by a space timing offset interval.

2. The control station of claim 1, wherein the space timing offset interval is approximately equal to a maximum round-trip time from a furthest receiver plus two frame duration intervals.

3. The control station of claim 1, wherein the first fixed time interval is equal to an integral number of frame duration intervals.

4. The control station of claim 3, wherein the integral number of frame duration intervals is equal to eight.

5. The control station of claim 1, wherein the second fixed time interval is approximately 45 msec.

6. The control station of claim 1, wherein a frame duration time interval is approximately equal to the second fixed time interval.

7. The control station of claim 6, wherein the frame duration time interval is approximately 45 msec.

8. The control station of claim 1, wherein the broadcast signal is an asynchronous DVB transport stream.

9. The control station of claim 1, wherein the return channel uplink is a TDMA signal.

10. A transceiver for transmitting a frame synchronized message, comprising:

a receiver which detects a frame reference marker and a control node timing message in a received broadcast signal;

a local clock adapted to tag the detected frame reference marker with a local reception time;

a timing recovery section which uses the control node timing message to determine a transmit frame start time; and a transmitter adapted to uplink a message during an assigned period after the transmit frame start time, wherein the timing recovery section uses the local reception time and local offset time to determine the transmit frame start time.

11. The transceiver of claim 10, wherein the timing recovery section compensates for satellite drift.

12. The transceiver of claim 10, wherein the control node timing message provides timing Information for a previously transmitted frame reference marker.

13. The transceiver of claim 10, wherein the timing recovery section is adapted to correct for a space liming offset.

14. The transceiver of claim 10, wherein the timing recovery section is adapted to derive a symbol timing reference using a receiver bit arrival rate.

15. The transceiver of claim 10, wherein the transmitter is adapted and controlled to transmit within a TDMA frame in accordance with a time-slot allocation scheme.

16. A method for providing communication timing information from a control station, comprising:

generating a timing marker;

determining a control station timing delay; and providing the timing marker and the control station timing delay in a message received by a remote user;

wherein the timing marker is a superframe marker, and wherein the superframe marker is periodically provided in messages to the remote user at a first fixed interval, and further comprising pulsing an inroute receiver at a time later than a time of the superframe marker pulse by a space timing offset interval.

17. The method of claim 16, wherein the space timing offset interval is approximately equal to a maximum round-trip time from a furthest remote user plus two frame duration intervals.

18. A method for transmitting a frame synchronized message, comprising: receiving a frame reference marker in a local receiver of one of a plurality of distributed user nodes;

timestamping the received frame reference marker with a local reception time;

receiving a control node timing differential at the local receiver;

correcting the local reception time by applying the control node timing differential and a local offset time;

determining a start time for a return channel frame using the corrected local reception time; and transmitting a first message from one of the plurality of distributed user nodes during an assigned period within the return channel frame.

19. The method of claim 18, wherein correcting the local reception time includes applying a correction for satellite drift.

20. The method of claim 18, wherein the control node timing differential is received after the received frame reference marker is timestamped with the local reception time.

21. The method of claim 18, further comprising locally deriving a system symbol timing reference using a bit arrival rate in the local receiver.

22. The method of claim 18, further comprising centrally receiving a plurality of different user messages, wherein each of the plurality of different user messages is transmitted within the return channel frame in accordance with a time-slot allocation scheme.

23. The method of claim 18, further comprising transmitting a second message from a different one of the plurality of distributed user nodes during a different assigned period within the return channel frame in accordance with a time-slot allocation scheme, wherein the different one of the plurality of distributed user nodes uses the frame reference marker to determine the different assigned period.

24. A communication system for sharing return channel uplink timing information, comprising: a common symbol timing reference;

a first control station transmitting a first broadcast data stream in accordance with the common symbol timing reference, said first control station including a first delay tracker to determine a first transmission delay associated with the first control station;

said first broadcast data stream including a non-real time frame marker and a first transmission delay message;

a first receiver to receive the first broadcast data stream, said first receiver receiving the first delay message and timestamping the non-real time frame marker with a first local time of receipt;

a first timing recovery circuit to determine an upcoming real-time return channel frame start time by adjusting the first local time of receipt by the first transmission delay and a first receiver offset time; and a first local transmitter to uplink a message in a predetermined time-slot after the real-time return channel frame start time.

25. The communication system of claim 24, further comprising: a second control station transmitting a second broadcast data stream in accordance with the common symbol timing references said second control station including a second delay tracker to determine a second transmission delay associated with the second control station;

said second broadcast data stream including non-real time frame marker and a second delay message;

a second receiver to receive the second broadcast data stream, said second receiver receiving the second delay message and timestamping the non-real time frame marker with a second local time of receipt;

a second timing recovery circuit to determine real-time return channel frame start time by adjusting the second local time of receipt by the second transmission delay and a second receiver offset time; and a second local transmitter to uplink a second user message in a different predetermined time-slot after the real-time return channel frame start time.

26. The communication system of claim 24, wherein said first broadcast data stream is an asynchronous DVB transport stream.

27. The communication system of claim 24, wherein said first broadcast data stream is encapsulated in an IP/DVr protocol layer.

28. The communication system of claim 24, further comprising a communication satellite to relay the transmitted first broadcast data stream to the first receiver.

29. A method for sharing a set of TDMA channels between a plurality of uplink channels, comprising:

providing a non-real time system reference timing message to a remote user;

determining a control station timing delay;

calculating a message transport delay;

offsetting a local time reference from the non-real time system timing by the message transport delay and the control station timing delay;

determining a realtime TDMA transmit frame timing from the offset local time reference; and transmitting uplink channel information in accordance with the realtime TDMA transmit frame timing and a TDMA time-sharing arrangement.

30. The method of claim 29, further comprising receiving a frame marker message encapsulated in a layered transport stream.

31. The method of claim 30, wherein said layered transport stream is an asynchronous DVB transport stream.

32. The method of claim 29, wherein the non-real time system timing message is provided to a plurality of remote users.

33. The method of claim 29, wherein the non-real time system reference timing message is provided to a plurality of remote users over more than one layered transport stream.

* * * * *